United States Patent [19]
Taylor et al.

[11] 3,878,799

[45] Apr. 22, 1975

[54] SEED BED SHAPING APPARATUS WITH AUTOMATIC MEANS FOR APPLYING PRESSURE TO THE SOIL

[76] Inventors: Clyde L. Taylor, 1545 S. Chinowith Rd., Visalia, Calif. 93277; Russell E. Jordan, 285 W. 1 St., Brawley, Calif. 92227

[22] Filed: Dec. 15, 1971

[21] Appl. No.: 208,480

Related U.S. Application Data

[63] Continuation of Ser. No. 860,927, Sept. 25, 1969, abandoned.

[52] U.S. Cl. .................. 111/59; 172/112; 172/157
[51] Int. Cl. ............................................. A01c 5/00
[58] Field of Search .......... 172/112, 71, 72, 63, 85, 172/157, 116; 111/85, 59, 469, 157, 538

[56] References Cited
UNITED STATES PATENTS

| | | | |
|---|---|---|---|
| 3,029,879 | 4/1962 | Wells, Jr. ...................... | 172/112 X |
| 3,128,833 | 4/1964 | Johnson et al. ................... | 111/59 X |
| 3,194,193 | 7/1965 | Walters .......................... | 172/112 X |
| 3,235,012 | 2/1966 | Johnson et al. ..................... | 172/157 |
| 3,316,865 | 5/1967 | Williams ............................. | 111/6 |
| 3,347,188 | 10/1967 | Richey ........................... | 172/112 X |
| 3,490,541 | 1/1970 | Adams Jr. ......................... | 172/116 |
| 3,538,987 | 11/1970 | Taylor .............................. | 111/7 X |

Primary Examiner—Stephen C. Pellegrino
Attorney, Agent, or Firm—Flehr, Hohbach, Test, Albritton & Herbert

[57] ABSTRACT

Apparatus for shaping seed beds having bed shaping means with a ground engaging member having at least a portion thereof movable in a generally vertical direction with respect to the surface of the bed. Power means is provided which is secured to the member for moving the portion of said member in a generally vertical direction to shape the surface of the bed.

7 Claims, 5 Drawing Figures

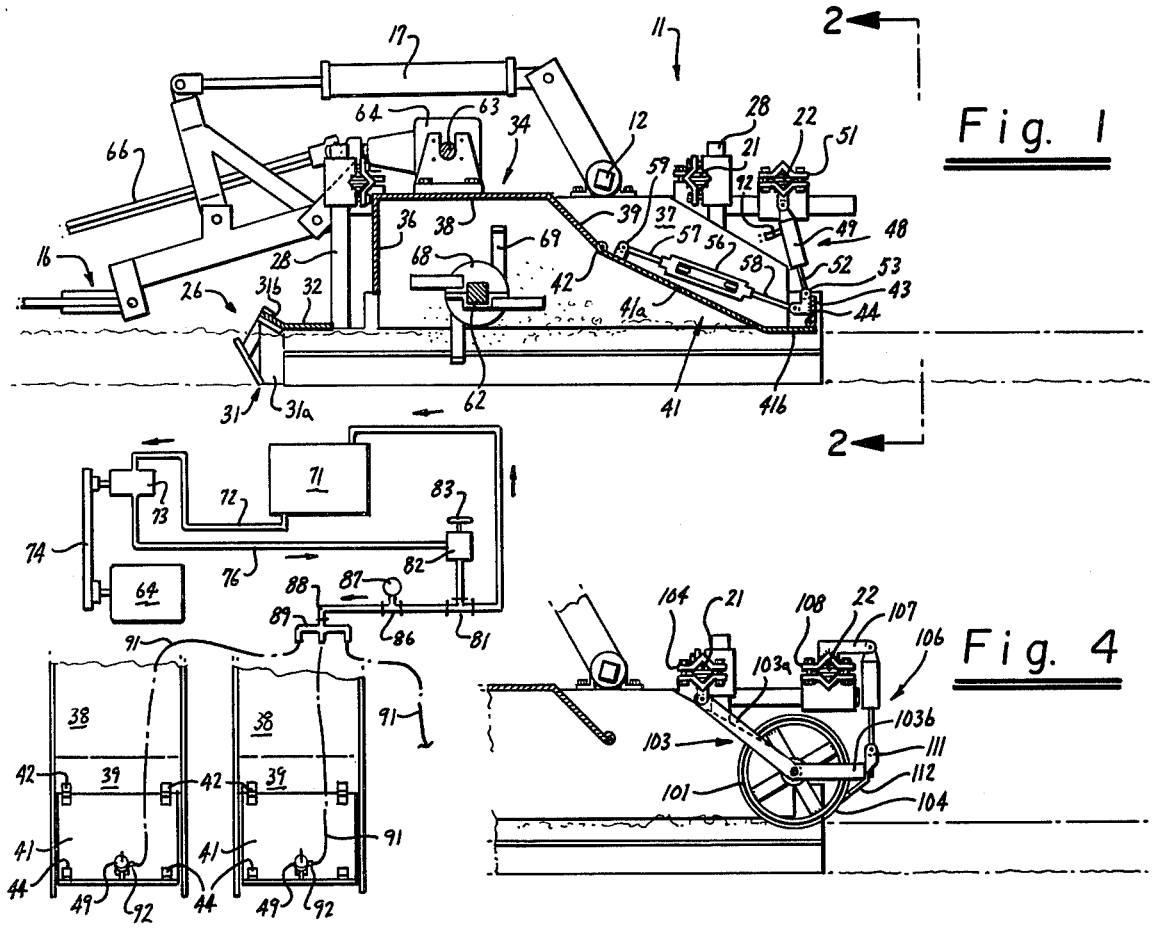
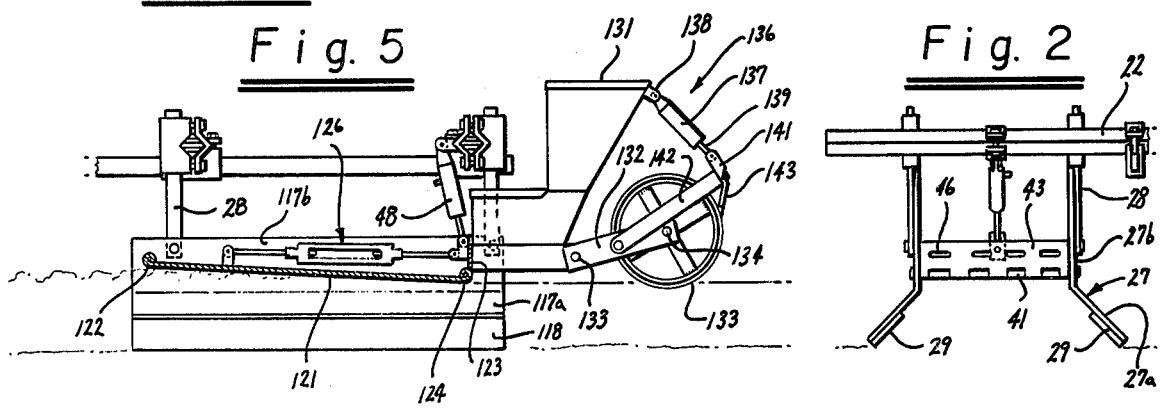

SEED BED SHAPING APPARATUS WITH AUTOMATIC MEANS FOR APPLYING PRESSURE TO THE SOIL

This is a continuation, of application Ser. No. 860,927 filed 9/25/69, now abandoned.

BACKGROUND OF THE INVENTION

Agricultural apparatus has heretofore been provided which has utilized bed shaping means and in which a member is urged into engagement with the soil. The means for urging the members into the soil normally has been in the form of yieldable spring members. In order to increase or decrease the pressure applied by the spring members, it has been necessary to manually adjust the spring members to obtain the desired pressure on the soil or ground over which the apparatus is travelling. It has been difficult and very time consuming to adjust such springs manually. In addition, it has been difficult to obtain the application of a uniform pressure to the seed beds. There is, therefore, a need for a new and improved agricultural apparatus.

SUMMARY OF THE INVENTION AND OBJECTS

The agricultural apparatus is of a type adapted for use in shaping seed beds in the ground which are arranged in elongated rows. A frame is provided which is adapted for movement in a direction longitudinally of the rows. Bed shaping means is mounted on the frame and includes at least one ground engaging member having at least one portion thereof movable in a generally vertical direction with respect to the surface of the seed bed. Power means is mounted on the frame and is secured to the member for moving said portion of said member in a generally vertical direction to shape the surface of the bed.

In general, it is an object of the present invention to provide an agricultural apparatus for use in the shaping of seed beds in which a bed shaping member is adjusted automatically as the apparatus travels over the seed beds to shape the surface of the seed beds.

Another object of the invention is to provide apparatus of the above character in which the pressure which is applied by the seed bed shaping member can be readily adjusted during movement of the apparatus through the field.

Another object of the invention is to provide agricultural apparatus which can be utilized with wet soil conditions.

Additional objects and features of the invention will appear from the following description in which the preferred embodiments are set forth in detail in conjunction with the accompanying drawings.

BRIEF DESCRIPTION OF THE DRAWING

FIG. 1 is a side elevational view of a seed bed shaping apparatus incorporating the present invention.

FIG. 2 is a rear elevational view taken along the line 2—2 of FIG. 1.

FIG. 3 is a schematic diagram of the hydraulic system utilized with the apparatus shown in FIGS. 1 and 2.

FIG. 4 is a partial side elevational view of another embodiment of the seed bed shaping apparatus incorporating the present invention.

FIG. 5 is a partial side elevational view of still another embodiment of the seed bed shaping apparatus incorporating the present invention.

DESCRIPTION OF THE PREFERRED EMBODIMENTS

The seed bed shaping apparatus includes a framework 11. The framework 11 consists of a member 12 which is pivotally mounted upon the framework 11 and extends transversely of the framework 11. Support assemblies 13 (not shown) are mounted upon the member 12 and carry rubber-tired ground-engaging wheels (not shown). A hitch 16 is mounted on the framework 11 and is provided for connecting the apparatus to a tractor which can be utilized for moving the apparatus through the field. Means of a conventional type is provided which includes a hydraulic cylinder 17 for causing pivotal movement of the member 12 and for causing shifting of the wheels relative to the framework 11 to cause the framework to be raised and lowered. A plurality of tool bars 21, 22 and 23 are mounted upon the framework 11 in a conventional manner and extend transversely of the framework.

Bed shaping means is mounted on the framework 11 and consists of a plurality of bed shapers 26 which are spaced laterally of the framework 11 and are secured to the framework 11. The bed shapers 26 are also arranged so that they extend longitudinally of the framework and are adapted to shape the beds as the agricultural apparatus is moved through the field. The bed shapers 26 in lateral cross-section are in the form of an inverted trough and are provided with a pair of spaced side bed shaping members 27. The side bed shaping members 27 are provided with outwardly and downwardly extending portions 27a which are adapted to form the sides of the beds. The bed shaping members 27 are also provided with vertically extending portions 27a which are secured to four spaced arms 28 with two of the arms secured to each of the side bed shaping members at spaced points extending longitudinally of the frame. The arms 28 are secured to the tool bars 21 and 23 as shown in FIGS. 1 and 2 of the drawings. The arms 28 are mounted in such a manner that they can be adjusted vertically with respect to the framework 11. The side bed shaping members 27 are provided with reinforcing members 29 which extend longitudinally of the bed shaping members. The bed shapers 26 are provided with outwardly flared inlets 31 which consist of a pair of spaced forwardly and outwardly extending portions 31a which are mounted upon the side bed shaping members 27 by suitable means such as welding. The inlets also include upwardly and forwardly extending portions 31b which are secured to top, generally horizontal walls 32 which form a part of each bed shaper. The top walls 33 are interrupted by openings 33 provided therein which open into incorporator housings 34 mounted on each of the bed shapers.

The incorporator housing 34 is provided with a vertical front wall 36, spaced parallel side walls 37 and a top wall 38. It also includes a downwardly and rearwardly extending wall 39 which terminates a substantial distance above the top of the bed shaper. The side walls 37 of the incorporator housing are formed by large plates which extend substantially the entire length of the bed shaper as shown particularly in FIG. 1.

Each of the bed shapers 26 includes at least one ground-engaging member which in the bed shaper shown in FIGS. 1 and 2 consist of a member 41 which has at least one portion thereof movable in a generally vertical direction with respect to the surface of the seed bed. As can be seen, the member 41 is secured to the wall 39 by a hinge 42 which lies in a horizontal plane so that the rear end of the member 41 can be raised and lowered in a generally vertical direction about the pivot axis formed by the hinge 42. The member 41 is provided with a downwardly and rearwardly inclined portion 41a and a generally horizontal rearwardly extending portion 41b. The member 41 extends between the side plates 37 and extends to the side plates 37. A mounting plate 43 is secured to the rear extremity of the member 41 by suitable means such as a hinge 44. The mounting plate 43 is provided with a plurality of slots 46 to facilitate mounting of other apparatus such as planters on the agricultural apparatus.

Power means is provided which is mounted on the frame and secured to the member 41 for moving the rear portion or extremity of the member 41 in a vertical direction with respect to the surface of the bed. This power means consists of a hydraulic actuator 48. The hydraulic actuator 48 consists of a cylinder 49 which is pivotally connected to a clamp assembly 51 which is secured to the tool bar 22. The actuator 48 also consists of a piston 52 which is pivotally connected to a bracket 53 mounted upon the mounting plate 43.

Means is provided for maintaining the mounting plate 43 in a generally vertical direction as it is raised and lowered and consists of a turn-buckle 56 which is threaded onto rods 57 and 58. The rod 57 is pivotally connected to a bracket 59 secured to the plate-like member 41 as shown, whereas the rod 58 is pivotally connected to the bracket 53. It can be seen that by rotating the turn-buckle 56 to adjust the spacing between the bracket 59 and the plate 43, the plate 43 can be pivoted about the hinge 44 so that it can be maintained in a generally vertical position.

An incorporating or mulching assembly 61 is provided within each incorporator housing 34. These assemblies 61 are mounted upon a shaft 62 which extends transversely of the frame and which is rotatably mounted upon the frame. The shaft 62 is driven by a chain (not shown) which is, in turn, driven by a shaft 63 connected to a right-angle gear unit 64 mounted upon the framework 11. The right-angle gear unit is driven by a power take-off shaft 66 which is adapted to be connected to the tractor which is utilized for pulling the agricultural apparatus through the field.

Each incorporator assembly 61 consists of semicircular plates 68 which are secured to the shaft 62 and upon which are mounted a plurality of blades or tines 69.

The hydraulic control system which is utilized for supplying fluid to the hydraulic actuators 48 is mounted on the framework 11 for each of the bed shapers. Such means consists of a fluid reservoir or sump 71 which is connected by a pipe 72 to a pump 73. The pump 73 is driven by a V-belt 74 which is driven by the gear unit 64. The output of the pump is supplied to a line 76 which is connected to a tee 81. A pressure relief valve 82 is provided with a knob or handle 83 which permits the pressure supplied to the line 84 to be varied through a suitable range such as from 20 psi to 200 psi. The pipe line 84 is connected to a tee 86 which has mounted thereon a pressure gauge 87 which can be utilized for reading the pressure which is supplied to the line 84. The tee 86 is connected by a pipe 88 to a manifold 89 which is connected to suitable piping such as a plurality of flexible hoses 91. The hoses 91 are connected to an inlet fitting 92 provided on each of the cylinders 49 of each of the hydraulic actuators 48 provided for each of the bed shapers 26. The outlet of the pressure relief valve 82 is connected to a return pipe 93 that is connected to the tank 71.

Operation and use of the agricultural apparatus may now be briefly described as follows. Let it be assumed that the apparatus is being utilized in a field in which the beds have been roughly formed and that it is desired to utilize the same for shaping the beds or, in other words, conditioning the beds so that seeds can be planted in the same. If desired, it can also be assumed that suitable other equipment such as planters have been mounted on the mounting plates 43 so that after the beds are shaped, the seeds are planted immediately after the beds have been shaped or conditioned by the apparatus.

In placing the apparatus in operation, the pressure relief valve 82 is adjusted so that a suitable pressure is applied to the ground-engaging member which is utilized for shaping the top of the bed in which the seeds are to be planted. It should be pointd out that the valve 82 can either be mounted on the apparatus or, in fact, can be mounted on the tractor in which the driver is positioned so that the valve can be readily adjusted during the time that the apparatus is moving through the field. The valve can be adjusted until a suitable pressure such as 50 psi is being applied to the actuators. Any fluid which is not required for maintaining this pressure on the actuators is returned through the pressure relief valve through the line 93 back to the tank 71.

It can be seen that as the apparatus is pulled through the field by the tractor, the sides of the beds are shaped by the side bed shaping members 27. At the same time, the top of the seed bed is broken up into relatively fine particles by the incorporator or mulching assemblies 61 so as to provide a mulch type cover for the top of the bed. Immediately after the bed has been broken up, the member 41 with the pressure applied to it by the hydraulic actuator 48 prevents any large clods or the like from escaping beneath the bottom of the member 41 and if there is a sufficiently large number of them, they will be retained within the incorporator housing 34 and will be broken up by the incorporator assembly 61. Thus, as the clods are broken up, the dirt from the clods will be smoothed over by the member 41. It is for this reason that the member 41 can also be called a "smooch board" because it closely engages the top of the seed bed and firms the top of the seed bed.

The use of the power system for the smooch boards or bed engaging members is particularly advantageous with the apparatus because regardless of the elevations of the top surfaces of the beds relative to each other, each bed will have applied to the top surface thereof a substantially uniform pressure as determined by the setting of the pressure relief valve 82. Thus, each bed will have its top surface treated substantially uniformly by the smooch boards or bed shaping members. Thus, for example, it is possible for the rear end of one smooch board to be substantially above the rear end of the other smooch board and still have substantially the same pressure being applied to both of the smooch boards or ground-engaging members.

Also, it can be seen that the pressure which is applied by the ground-engaging members or smooch boards to the top surface can be readily adjusted merely by adjusting the pressure relief valve 82 to either increase or decrease the pressure. This can be done during the time that the apparatus is being moved through the field so that the operator can visually observe the results thereof. It can be seen that the smooch boards can act independently of each other but all of them have the same pressure applied to them by the hydraulic actuators 48.

An additional embodiment of the agricultural apparatus is shown in FIG. 4 and is of the type which can be utilized where the ground is too wet to utilize a ground-engaging member of the type which serves as a smooch board. As shown in FIG. 4, the smooch board 41 can be removed and a ground-engaging member in the form of a wheel 101 can be utilized. The wheel 101 is mounted on a shaft 102 mounted between a pair of arms 103. The arms 103 are provided with a downwardly and rearwardly inclined portion 103a and a generally horizontal rearwardly extending portion 103b. The forward ends of the portions 103a are pivotally mounted upon clamp assemblies 104 mounted upon the tool bar 21. The shaft 102 is secured to the arms 103 at the juncture of the portions 103a and 103b.

Power means is provided for moving the wheel 101 vertically with respect to the surface of the beds being shaped and consists of hydraulic actuators 106 in which the cylinders 107 are pivotally connected to arms 107 secured to bracket assemblies 108 mounted on the tool post 22. The pistons 109 of the hydraulic actuators are pivotally connected to brackets 111 secured to the rear extremities of the arms 103. The hydraulic actuators 106 are connected to a hydraulic system similar to that shown in FIG. 3. Scrapers 112 are provided at the extremities of the arms 103 and are adapted to engage wheels 102 to scrape off of the wheels any mud or dirt which may be picked up by the wheels.

The operation of the apparatus is very similar to that hereinbefore described. It can be seen that by applying hydraulic fluid at a predetermined pressure to the hydraulic actuators, that a predetermined force will be applied by the hydraulic actuators to the ground-engaging members in the form of wheels 101. As in the previous embodiment, the wheels 101 can move upwardly independently of each other and regardless of the terrain will apply a predetermined pressure to the surface of the beds so that the beds will be compacted in the proper manner for the planting of seeds or other operations desired.

Another embodiment of the apparatus is shown in FIG. 5 in which bed shapers 116 are utilized which do not include an incorporator housing or an incorporator. Each of the bed shapers 116 is provided with side bed shaping members 117 which have outwardly extending inclined portions 117a and vertical portions 117b. Reinforcing members 118 are secured to the portions 117a. Arms 28 of a type hereinbefore described are utilized for securing the side members 117 to the framework 11. The forward extremities of the bed shapers 116 are provided with flared inlets of the type hereinbefore described in conjunction with the bed shapers 26. The ground-engaging members corresponding to the ground-engaging members 41 are the members 121 which are substantially in the form of flat plates extending between the side members 11 and which have their forward extremities hinged to the side members 111 by suitable means such as pins 122. It can be seen that the members 121 extend substantially the entire length of the bed shapers. Plates 123 which extend in a generally vertical direction are pivotally connected to the rear extremities of plate-like members 121 and are hingedly connected thereto by hinges 124. Means is provided for retaining the plates 123 in a generally vertical position and consist of turn-buckle assemblies 126 similar to those described in conjunction with the embodiment shown in FIGS. 1 and 2. Hydraulic actuators 48 of the type hereinbefore described in conjunction with FIGS. 1 and 2 are also provided in the embodiment shown in FIG. 5.

Planters 131 of a conventional type are secured to the plates 123. Means is associated with each of the planters for compressing the ground after the seeds have been planted by the planter and consists of a pair of spaced arms 132 which are pivotally connected to the planter by pins 133. A ground-engaging wheel 133 is mounted upon a shaft 134 mounted on the ends of the arms 132.

Power means is provided for controlling the pressure which is applied by the wheels 133 to the surface of the ground and includes hydraulic actuators 136. The hydraulic actuators consist of a cylinder 137 which is pivotally mounted on a bracket 138 secured to the planter. The actuator also consists of a piston 139 which is pivotally connected to a bracket 141 secured at the rear extremities of arms 142 which are rigidly connected to the arms 132. A wheel scraper 143 is also carried by the bracket 141.

The hydraulic actuators 136 can be connected to a suitable source of fluid similar to that shown in FIG. 3. In view of the fact that it may be desirable to apply a different pressure with the actuators 136 than the actuators 48, a separate line can be connected to the flow divider 77 and supplied through a separate pressure relief valve and pressure gauge to a manifold. The manifold would be connected to the hydraulic actuators 136 and the pressure relief valve would be connected to the same return line to the tank. In this manner, the pressure applied to the actuators 48 and 136 can be adjusted independently of each other to apply the desired pressure to the surface of the ground prior to planting and immediately after planting by the apparatus. Each of the wheels 133 can move independently of each other. The smooch boards or members 121 can move independently of the wheels 133 and of each other. It thus can be seen that this gives the operator of the apparatus great versatility in operating the apparatus and also permits the operator to ensure that the proper pressure is applied at the proper points in preparing the seed beds before planting and conditioning the seed beds after planting.

It is apparent from the foregoing that there has been provided a new and improved agricultural apparatus which is particularly adapted for the shaping of seed beds and to ensure that the seed beds are properly prepared prior to seeding and are properly compacted after seeding.

We claim:

1. In an agricultural apparatus of the type adapted for use in shaping raised seed beds in the ground having sloped sides and a top surface which are arranged in elongated rows, a framework, wheeled gound-engaging means carried by the framework to permit movement of the framework in a direction longitudinally of the rows, bed shaping means mounted on the framework and including at least one bed-shaper in the form of an inverted trough having a pair of spaced side-shaping members and ground-engaging member disposed intermediate the side bed-shaping members and having at least one portion thereof movable in a generally vertical direction with respect to the surface of the seed bed, and power means including an actuator on the framework and secured to said ground-engaging member for moving said portion of said ground-engaging members in a vertical direction with respect to the framework to shape the surface of said bed, said power means also including means for supplying a fluid under a predetermined pressure to said actuator whereby said portion of ground-engaging members is yieldably urged into engagement with the top surface of the bed to apply a uniform force to the top surface of the bed regardless of changes in elevation of the top surface of the bed relative to the framework as the framework is advanced along the rows.

2. Apparatus as in claim 1 wherein said ground-engaging means is in the form of a wheel adapted to engage the top of the seed bed.

3. Apparatus as in claim 1 wherein said member forms the top surface of said bed shaper and extends between said side walls substantially the entire length of the bed shaper.

4. In an agricultural apparatus of the type adapted for use in shaping raised seed beds in the ground having sloped sides and a top surface which are arranged in elongated rows, a framework, wheeled ground-engaging means carried by the framework to permit movement of the framework in a direction longitudinally of the rows, bed shaping means mounted on the framework and including at least one bed-shaper in the form of an inverted trough having a pair of spaced side-shaping members and a ground-engaging member disposed intermediate the side-shaping members and having at least one portion thereof movable in a generally vertical direction with respect to the surface of the seed bed, power means including an actuator mounted on the framework and secured to said ground-engaging member for moving said portion of said ground-engaging member in a generally vertical direction with respect to the framework to shape the top surface of the seed bed, said power means also including means for supplying a fluid under a predetermined pressure to said actuator whereby said portion of the ground-engaging member is yieldably urged into engagement with the top surface of the seed bed to apply a uniform force to the top surface of the seed bed regardless of changes in elevation of the top surface of the seed bed relative to the framework as the framework is advanced along the rows, an incorporator housing mounted on said framework in front of said bed-shaper and an incorporator mounted in said incorporator housing.

5. Agricultural apparatus as in claim 4 wherein said bed-shaper is formed integrally with said incorporator housing, wherein said pair of spaced side-shaping members are in the form of rearwardly extending extensions of the incorporator housing and wherein said ground-engaging member has one thereof pivotally mounted on said incorporator housing.

6. In an agricultural apparatus of the type adapted for use in shaping raised seed beds in the ground having sloped sides and a top surface which are arranged in elongated rows, a framework, wheeled ground-engaging means carried by the framework to permit movement of the framework in a direction longitudinally of rows, bed-shaping means mounted on the gramework and including at least one bed-shaper in the form of an inverted trough having a pair of spaced side shaping members for shaping the sloped sides of the seed bed and a ground engaging member disposed between the spaced side shaping members for shaping the top surface of the seed bed having at least one portion thereof movable in a generally vertical direction with respect to the top surface of the seed bed, power means including an actuator mounted on the framework and secured to said ground-engaging member for moving said portion of said ground-engaging member in a generally vertical direction with respect to the framework to shape the top surface of the seed bed, said power means also including means for supplying a fluid under a predetermined pressure to said actuator whereby said portion of the ground-engaging member is yieldably urged into engagement with the top surface of the seed bed to apply a uniform force to the top surface of the seed bed regardless of changes in elevation of the top surface of the seed bed relative to the framework as the framework is advanced along said rows, and an additional member pivotally mounted on said ground-engaging member adjacent the rear extremity of the same and means connected between said ground-engaging member and said additional member for maintaining said additional member in a generally vertical position as said portion of the ground engaging member is moved in a generally vertical direction, said additional member being capable of being utilized to support additional attachments for use on the apparatus.

7. Apparatus as in claim 6 together with a planter secured to said member, a ground-engaging wheel adapted to engage the top surface of the seed bed and pivotally mounted on the planter to move in a vertical direction and adapted to engage the ground to the rear of the planter, and power means connected to the planter and to said wheel for moving said wheel in a vertical direction for applying a predetermined pressure to the wheel.

* * * * *